United States Patent [19]

Andersson et al.

[11] Patent Number: 4,627,259

[45] Date of Patent: Dec. 9, 1986

[54] INDUCTIVE EDGE HEATING DEVICE FOR HOT WORKING STRIP MATERIAL AND THE LIKE

[75] Inventors: Lars Andersson; Hans Backlund; Bengt Henriksson; Thomas Moström, all of Västerås, Sweden

[73] Assignee: Asea Aktiebolag, Västerås, Sweden

[21] Appl. No.: 802,724

[22] Filed: Nov. 29, 1985

[30] Foreign Application Priority Data

Nov. 30, 1984 [SE] Sweden .................. 8406062

[51] Int. Cl.$^4$ ............................. B21B 45/00
[52] U.S. Cl. .......................... 72/202; 219/10.43
[58] Field of Search .............. 72/13, 128, 200, 201, 72/202, 342; 219/10.41, 10.43, 10.61 R

[56] References Cited

U.S. PATENT DOCUMENTS

| | | | |
|---|---|---|---|
| 3,031,555 | 4/1962 | Ross et al. .............. | 219/10.61 R |
| 3,705,967 | 12/1972 | Bobart et al. .............. | 219/10.41 |
| 4,054,770 | 10/1977 | Jackson .............. | 219/10.61 R |
| 4,382,374 | 5/1983 | Kopineck .............. | 72/202 |
| 4,440,584 | 4/1984 | Takeshige et al. .............. | 72/201 X |
| 4,463,585 | 8/1984 | Laws et al. .............. | 72/202 X |

FOREIGN PATENT DOCUMENTS

| | | | |
|---|---|---|---|
| 47-9253 | 3/1972 | Japan .............. | 219/10.43 |
| 53-43609 | 4/1978 | Japan .............. | 72/200 |
| 55-22422 | 2/1980 | Japan .............. | 72/202 |
| 56-165510 | 12/1981 | Japan .............. | 72/202 |

Primary Examiner—E. Michael Combs
Attorney, Agent, or Firm—Watson, Cole, Grindle & Watson

[57] ABSTRACT

An edge-region heating device for use in the hot rolling of metallic strip after some cooling of the strip has occurred, employs an induction heater to preferentially raise the temperature of the edge-regions of the strip to compensate for the faster cooling of these edge regions whereby a more uniform temperature is obtained over the cross-section of the strip when a later hot rolling operation is performed.

5 Claims, 4 Drawing Figures

INDUCTIVE EDGE HEATING DEVICE FOR HOT WORKING STRIP MATERIAL AND THE LIKE

TECHNICAL FIELD

The present invention relates to a device for rolling metallic slabs, strip or sheet, which employs one or more inductive edge heaters for heating the edges of a billet which issues from a continuous casting machine, or a strip or sheet issuing from a hot rolling mill or a pair of hot rolls, the edge heaters being arranged to surround outer parts of the edges of the slab, strip or sheet and thereby to heat these outer edge parts.

DISCUSSION OF PRIOR ART

In conventional hot rolling, cold rolled slabs are heated to the rolling temperature, for example in a fuel-fired furnace. This can be described as "cold charging". An improvement of this cold charging method comprises placing a continuously-cast, still-hot slab in a thermally-insulated box to slow down the heat loss from the slab. The slab, after removal from the box, is subsequently additionally heated in a fuel-fired furnace and is then rolled. This can be described as "hot charging".

Lately, there has been a general desire to change to direct rolling, for example rolling a slab immediately after it has been continuously cast or straight after a preceding hot rolling operation on the slab.

After, for example, continuous casting, the greater part of the cross-sectional area of the cast slab has a suitable rolling temperature, whereas edge regions of the slab have cooled to a temperature which is too low for direct rolling.

In hot rolling of sheet and strip, the edges cool somewhat more rapidly than internal regions of the cross-section, and this is particularly noticeable in the case of a fine rolling stage. Increased wear on the rolls will occur as a consequence of the colder edges. Edges which are cooler than the optimum rolling temperature have a greater tendency to crack.

One object of the invention is to provide a solution to the problems described above and other problems associated therewith.

SUMMARY OF THE INVENTION

A device according to the invention is characterised in that the induction heater or heaters consist of one or more bent plane coils which are arranged such that the outermost parts of the edge region(s) of the slab, strip or sheet will pass through more of the coil than parts of the slab, strip or sheet which are located closer to the interior, the outer edge region(s) thus being heated more than parts located closer to the interior. The edge regions are desirably heated to a temperature approximately corresponding to that of the rest of the slab, sheet, or strip. Such an inductive additional edge heating provides good conditions for subsequent hot working.

ADVANTAGES OF THE INVENTION

The advantages of a device according to the invention are as follows:
Great energy savings in comparison with prior art devices
A higher material yield due to a reduced number of oxide scales
A shorter process time
Reduced roll wear
Longer time intervals between roll changing
Improved quality of the as-rolled material
Reduced number of edge cracks.

BRIEF DESCRIPTION OF THE DRAWINGS

The invention will now be further described, by way of example, with reference to the accompanying drawings, wherein.

DESCRIPTION OF PREFERRED EMBODIMENTS

Figure 1:
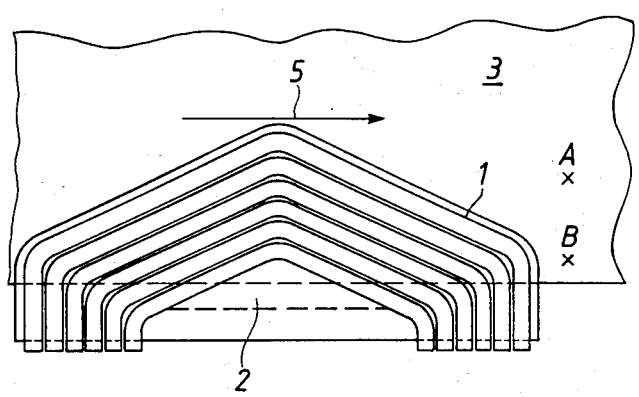
FIG. 1 shows schematically, in plan, an inductive heater, surrounding an edge region of a slab strip.
Figure 2:
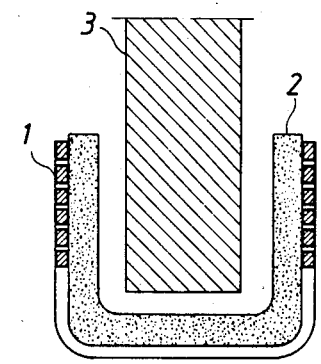
FIG. 2 shows the slab edge region and the coil of FIG. 1 in section.

A continuously cast slab 3 (or a hot-rolled strip or sheet), an edge region of which has cooled to below the minimum temperature suitable for a subsequent hot rolling operation, is contained in an inductive heater 1 in the form of a plane induction coil, bent into U-shaped form around a ceramic lining 2. The slab 3 moves past the heater 1 in the direction of the arrow 5.

Each coil part of the coil 1 is bent into vee-shaped form above and below the edge region(s) of the slab 3 with the apex of the vee directed towards the central region of the slab 3 as the latter passes through the heater 1. In this way the heating effect on the slab 3 is greater at the outer edge (point B) than at the point A, which is closer to the central region. In this way a major part of the heating effect arises in the region where the cooling effect is greatest. Normally, the two opposite edge regions are separately heated, although only one edge region of the slab 3 is shown in the drawings.

In the case of thicker strip or sheet or slabs (e.g. in the thickness ranges 200 to 300 mm), single-phase frequency current (c. 50–1000 Hz) is supplied to the coil 1, and in the case of thinner strip or sheet (e.g. 20 mm thick) single-phase frequency current (c. 1000–3000 Hz) is supplied to the coil 1.

The depth of penetration of the heating effect is greater in the case of a 50 or 60 Hz mains frequency supply, which explains the frequency choice for the two cases referred to above.

The heating of the edge region(s) takes place either after a continuous casting operation or after a preceding hot rolling operation.

Figure 3:
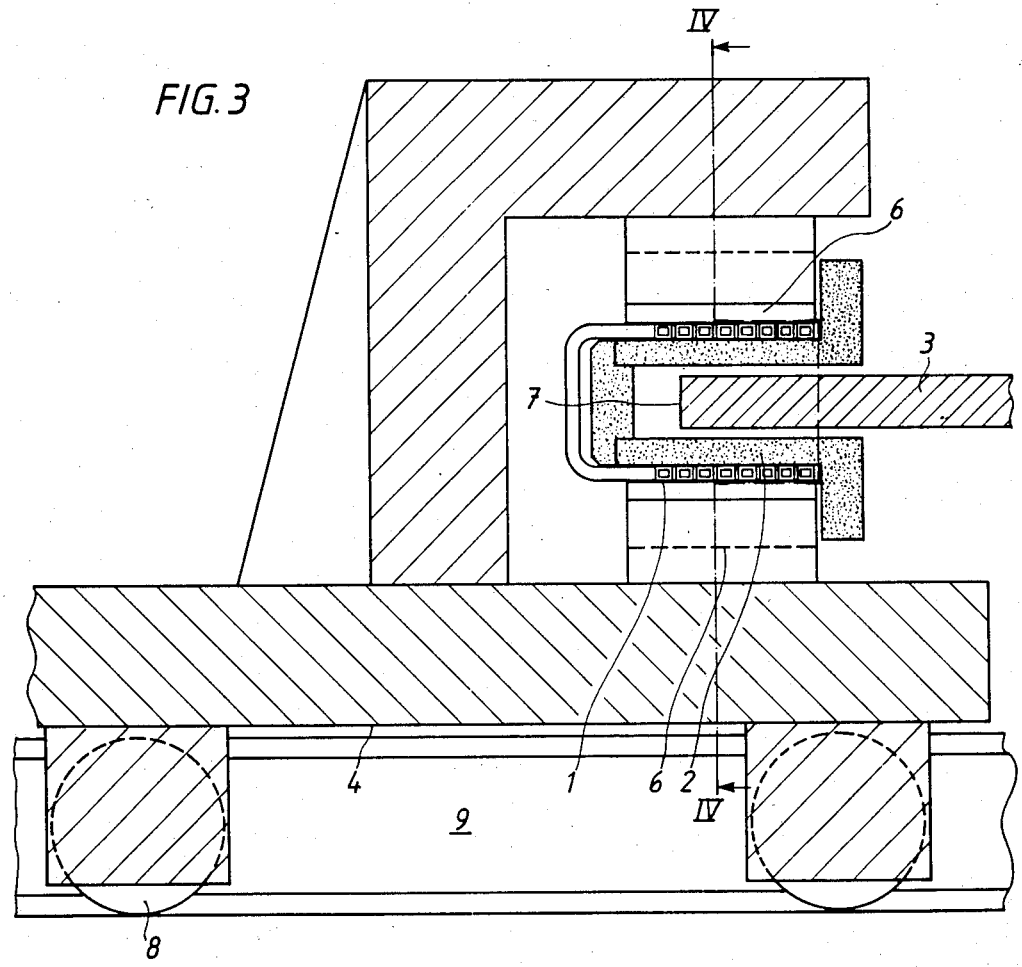
FIGS. 3 and 4 show a modified form of inductive heater in greater detail, sectioned, respectively, on the lines III—III and IV—IV.
Figure 4:
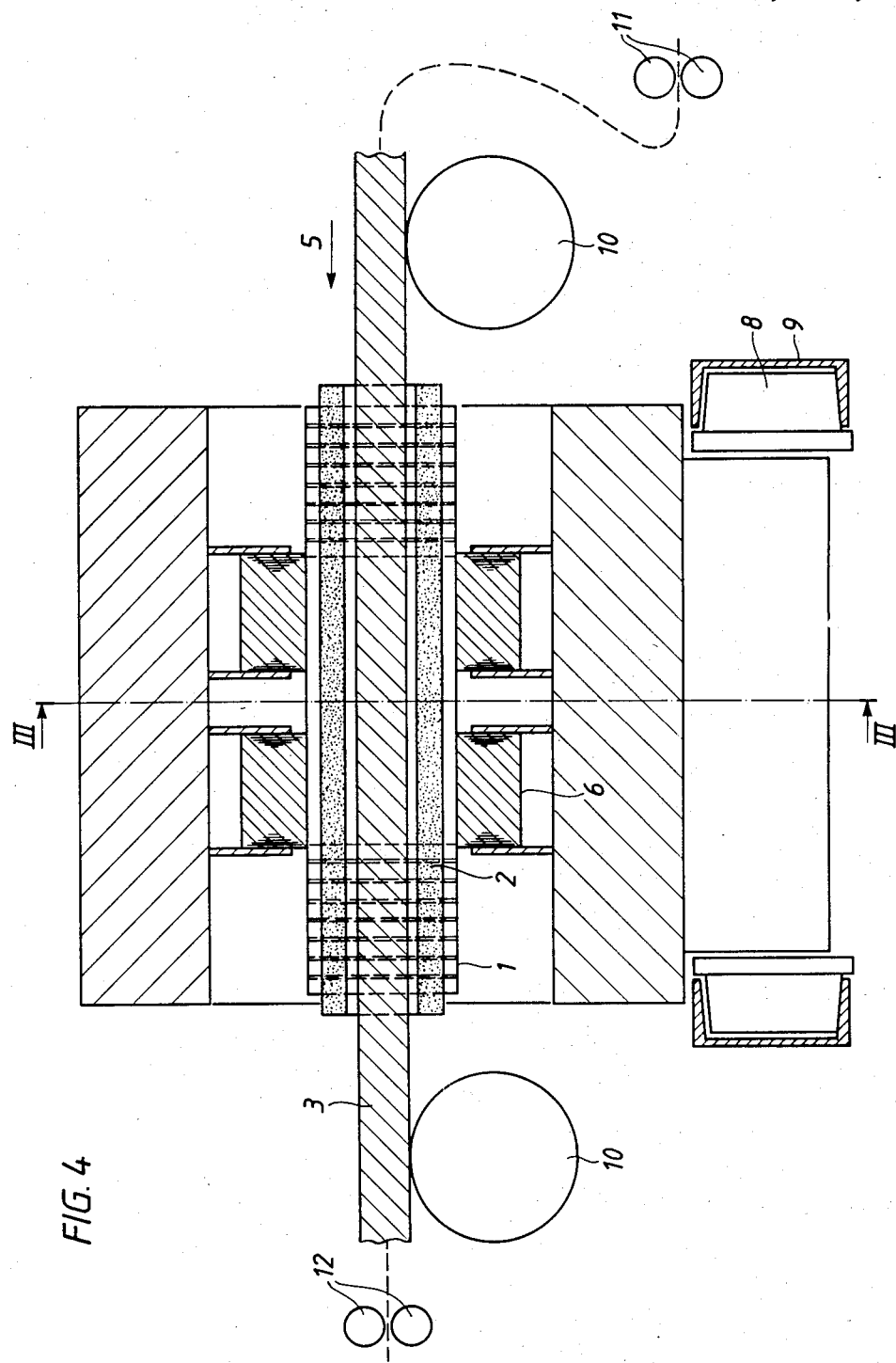

A modified form of edge-region heating device according to invention is shown in FIGS. 3 and 4. These Figures show an inductive heater supported on a carriage 4 having wheels 8 rolling in rails 9. It can be seen from FIG. 3 (which is a section on line III—III in FIG. 4) how the coil 1 with its ceramic layer 2 and a surrounding iron yoke 6 can be moved to and from the heating position in relation to the outer edge 7 of the passing slab 3. The slab 3 is supported on rolls 10 during the edge heating operation. The heating is, of course, suitably performed along both the edges after the egress of the slab 3 from a continuous casting machine or a preceding hot rolling mill, the rolls of which are shown schmatically at 11. The degree of overlap of the heater 1 over the edge region of the slab 3 can be adjusted such that a substantially uniform temperature exists across the full width of the slab which is to be hot rolled in a subsequent rolling mill. FIG. 4 (which is a section on line IV—IV in FIG. 3) shows the heater turns unsectioned.

After the temperature of the slab 3 has been unified across its transverse cross-section in the device of FIG. 4 it can be passed to further heated rolls (shown schematically at 12) for further shaping.

The exact design of the inductive heater coil is, of course, determined by the shape of the slab, strip or sheet to be heated; however, in principle the edge region is to be confronted on three sides by the inductive heater and the heating effect should have its maximum effect in the vicinity of the outermost edge.

The devices shown in the drawings and described above can be modified in many ways within the scope of the following claims.

What is claimed is:

1. An edge-region heating device for use in the rolling of an elongated metal member having edge regions and a central part between the edge regions, which edge regions are cooler than said central part, which edge-region heating device is arranged to contain one edge region of the elongated member for inductively heating the same, wherein the heating device includes an induction coil having a plurality of coil parts, each of which coil parts is bent into a V-shape around the said one edge region of the elongated metal member with the apex of each V being further away from the outer edge of the elongated metal member than the remainder of said coil part such that the outermost parts of the said one edge region will pass more of the coil parts than parts of the member located closer to the said central part, the said one edge region of the elongated member thereby being heated to a greater extent than said parts of the member located closer to said central part to reduce the temperature difference between the said one edge region and the said central part.

2. A device according to claim 1, in which each coil part has a V-shaped form in two spaced apart parallel planes, the edge region of the elongated material being located between said spaced apart planes.

3. A device according to claim 1, in which a ceramic layer is arranged between the coil parts and the edge region of the elongated material to be heated in the device.

4. An edge-region heating device according to claim 1, in which said device is positioned at each edge of the hot rolled sheet of metallic material after issuing from an upstream pair of hot rolls and prior to being fed between a subsequent downstream roll pair.

5. An edge-region heating device according to claim 4, said device being connected to a current source with a single-phase current of a frequency in the range 100 to 3000 Hz if the sheet is about 20 mm and in the range of 50 to 1000 Hz if the sheet is in the thickness range 200 to 300 mm.

* * * * *